(12) United States Patent
Lewis (10) Patent No.: US 6,184,800 B1
(45) Date of Patent: Feb. 6, 2001

(54) VISUAL AUTOMOBILE ALIGNMENT PARKING DEVICE

(76) Inventor: Homer B. Lewis, 1555 28th Ave., Vero Beach, FL (US) 32960

( * ) Notice: Under 35 U.S.C. 154(b), the term of this patent shall be extended for 0 days.

(21) Appl. No.: 09/238,215

(22) Filed: Jan. 27, 1999

(51) Int. Cl.[7] ................................................. B60Q 1/48
(52) U.S. Cl. ...................... 340/932.2; 340/958; 340/988; 116/202
(58) Field of Search ................................. 340/932.2, 958, 340/988; 116/202, 28 R (56) References Cited

U.S. PATENT DOCUMENTS

| | | |
|---|---|---|
| 2,731,880 | 1/1956 | Beeson . |
| 4,257,706 | 3/1981 | Smith . |
| 4,665,378 * | 5/1987 | Heckethorn ........................ 340/932.2 |
| 4,813,758 | 3/1989 | Sanders . |
| 4,941,263 | 7/1990 | Hirshberg . |
| 4,965,571 | 10/1990 | Jones . |
| 5,127,357 | 7/1992 | Viskovich . |
| 5,285,205 * | 2/1994 | White ................................ 340/932.2 |
| 5,341,132 | 8/1994 | Dorev et al. . |

OTHER PUBLICATIONS

Pedestal Corp., Inc., Car Stop Installation Instructions, Mar. 31, 1999, pp. 1–2 (Pedestal Corp., Inc. Emporia, Kansas U.S.A.).

Damark International, Inc., Damark Product Catalog, Jun. 1999, p. 39 (Damark International, Inc., Minneapolis, MN U.S.A.).

Holigan Group, Ltd., "The Perfect Park," Michael Holigan's YourNewHouse Internet Web Site, Feb. 19, 1999, pp. 1–2, Holigan Group, Ltd.

* cited by examiner

*Primary Examiner*—Daryl Pope
(74) *Attorney, Agent, or Firm*—Law Offices of Royal W. Craig (57) ABSTRACT

A visual parking aid comprising a laser pointer supported by a mounting bracket configured for removable attachment to the interior of a vehicle's windshield. The mounting bracket houses the laser power source such that the laser is only made operational when it is correctly positioned upon the mounting bracket. In use, the laser is focused forward from the vehicle so that it displays an image on the wall surface in front of the moving vehicle. As the vehicle approaches the wall, the image on the wall surface descends until it reaches a predetermined stopping point, informing the driver that they have reached the proper parking position.

20 Claims, 5 Drawing Sheets

VISUAL AUTOMOBILE ALIGNMENT PARKING DEVICE

BACKGROUND OF THE INVENTION

1. Field of the Invention

The present invention relates to a parking aid and, more particularly, to an improved visual parking aid comprising a Class IIIA laser pointer supported by a mounting bracket configured for removable attachment to the interior of a vehicle's windshield. The power source for the laser is housed within the laser housing but is provided with a break in the power circuit that may only be completed by mating the laser with its mounting bracket. Thus, the laser is only made operational when it is correctly positioned upon the mounting bracket. In use, the laser is focused forward from the vehicle so that it displays an image on the wall surface in front of a moving vehicle forwardly moving into a parking space, or behind a vehicle backing into a parking space. As the front or rear of the vehicle approaches the wall, the image on the wall surface descends until it reaches a predetermined stopping point, informing the driver that they have reached the optimal parking position.

2. Description of the Background

Many automobile operators experience difficulty when attempting to judge the distance between the front of their vehicle and an obstruction in front of the vehicle or between the rear of their vehicle and an obstruction behind the vehicle. This problem is especially perplexing in the context of parking a vehicle in a garage or in a parking space facing a wall. For example, owners of larger vehicles may wish to park their vehicle in a garage while leaving some space between the rear of the vehicle and the garage opening to ensure easy maneuvering around the parked vehicle. Such an effort requires the driver to strike a delicate balance between the front and rear space forward of and behind the vehicle. Unfortunately, in an attempt to optimize such space, a driver having difficulty judging the distance between the front of her vehicle and the wall in front of the vehicle may inadvertently impact the wall with the vehicle's bumper, causing unwanted and potentially costly damage to both the vehicle and structure. While through continued trial and error, skilled vehicle operators may eventually find an optimal position in which to park their vehicle, many vehicle operators find this a hopeless task, and as a result leave an unnecessarily large amount of space between the front of the vehicle and any obstruction in front of the vehicle.

Several optical systems have been developed in the past in an attempt to assist drivers in parking their vehicles in an optimal position without risking a destructive impact between the vehicle and an obstruction. For example, U.S. Pat. No. 4,257,706 to Smith discloses a vehicle reversing guide comprising a pair of line-of-sight posts positioned to allow a driver to establish a line of sight along the left side of his vehicle to target the intersection of the wall and the ground.

U.S. Pat. No. 4,813,758 to Sanders discloses a vehicle parking guide comprising vertical strips for informing a driver of his lateral position within a garage, and a downwardly angled mirror for informing a driver of his forward position within a garage.

U.S. Pat. No. 4,941,263 to Hirshberg discloses a vehicle parking guide comprising an incandescent lamp which directs a "virtual" image into the driver's field of view. The driver must judge the point at which this virtual image lies in the same plane as the wall or other obstruction in front of the vehicle to determine the optimal point at which to stop forward motion of the vehicle.

U.S. Pat. No. 5,127,357 to Viskovich discloses a vehicle parking guide comprising an adjustable mirror positioned next to a garage door opening which reflects the vehicle's brake lights to the driver through the driver's side view mirror, indicating to the driver that they have achieved the desired parking position.

Finally, both U.S. Pat. No. 4,965,571 to Jones, and 5,341,132 to Dorey et al. disclose vehicle parking guides having mechanically-actuated indicators which activate a light or other signal when a portion of the vehicle engages the respective actuator, indicating to the vehicle operator that they have achieved the desired parking position.

Each of the above described devices have associated therewith deficiencies which heretofore have prevented their widespread acceptance or usage. Many of the prior art devices rely on the driver's line of sight. Thus, when a different driver operates the vehicle, such driver naturally having a different perspective and thus a different line of sight from the driver for whom the device was originally configured, the new driver's view and line of sight will either require adjustment of the device or will result in a different parking location resulting for each new driver. Other prior art devices require mechanical actuators which themselves are at risk of damage should the vehicle operator misjudge the distance between their vehicle and the mechanical actuator. Accordingly, it would be a great advantage to provide a visual parking aid which was safe, easy to use, and usable by any vehicle operator without the need for adjustment.

SUMMARY OF THE INVENTION

It is, therefore, an object of the present invention to provide an improved visual parking aid which provides any operator of a given vehicle a mechanism to judge the distance between the front of the vehicle and an obstruction immediately in front of the vehicle.

It is another object of the present invention to provide a visual parking aid which indicates a vehicle's distance from an obstruction in front of the vehicle irrespective of the point of view of the driver.

It is yet another object of the present invention to provide a visual parking aid which projects an indicator image on an obstruction in front of the vehicle which lies within the vehicle operator's normal forward field of vision.

It is still yet another object of the present invention to provide a visual parking aid in the form of a laser which may only be operated when placed within a housing affixed to a vehicle.

It is a further object of the present invention to provide a visual parking aid which has no moving parts.

It is a still further object of the present invention to provide a visual parking aid which indicates both longitudinal and latitudinal position of a vehicle simultaneously from a single indicator.

It is still yet another object of the present invention to provide a visual parking aid which is entirely self contained and independent of any components or elements outside of the vehicle.

It is even still yet another object of the present invention to provide a visual parking aid in the form of a laser having an indicator for indicating operation of the laser.

These and other objectives are accomplished through an improved visual parking device comprising a Class IIIA laser pointer mounted on the interior of a vehicle's windshield, and directed outward towards the front of the vehicle. The laser is mounted on a cradle assembly having a top panel which is pivotally attached to a forwardly extending support arm. The front most portion of the support arm is provided with a suction cup for removably attaching the combined cradle and laser assembly to the interior of a vehicle windshield. The cradle is also provided with a support lip extending upward from its bottom laser support panel for holding the laser in place during use. The rear most portion of the bottom laser support panel is provided with male electrical connectors configured to be received by female electrical connectors located on the bottom face of the laser housing. The female electrical connectors extend into the laser housing and interrupt the power circuit held therein, such that the laser is made inoperable until the male electrical connectors on the support panel are received. In use, the laser power supply is prevented from operating the laser until the laser is properly seated in its support cradle with the male and female electrical connectors engaged. In this way, the operator is ensured that any safety hazard resulting from the removal and misuse of the laser from its support cradle on the is interior of the vehicle's windshield is eliminated.

In use, the laser projects an image outward from the vehicle windshield (or rearward from the back window of a reversing vehicle) and onto a wall or any other obstruction in front of the vehicle. As the operator moves the vehicle forward towards the final, parked position, the image from the laser gradually travels down the wall or obstruction towards a sign or other indicator which is pre-positioned on the wall surface to indicate the optimal final parking position for the vehicle. When the image ultimately arrives at the predesignated final location on the wall in front of the vehicle, as marked by the sign or other indicia on the wall, the driver knows to cease forward motion of the vehicle. The operator is thus able to easily, safely, and consistently park his vehicle in a parking spot in such position as to optimize the space remaining around the parked vehicle.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
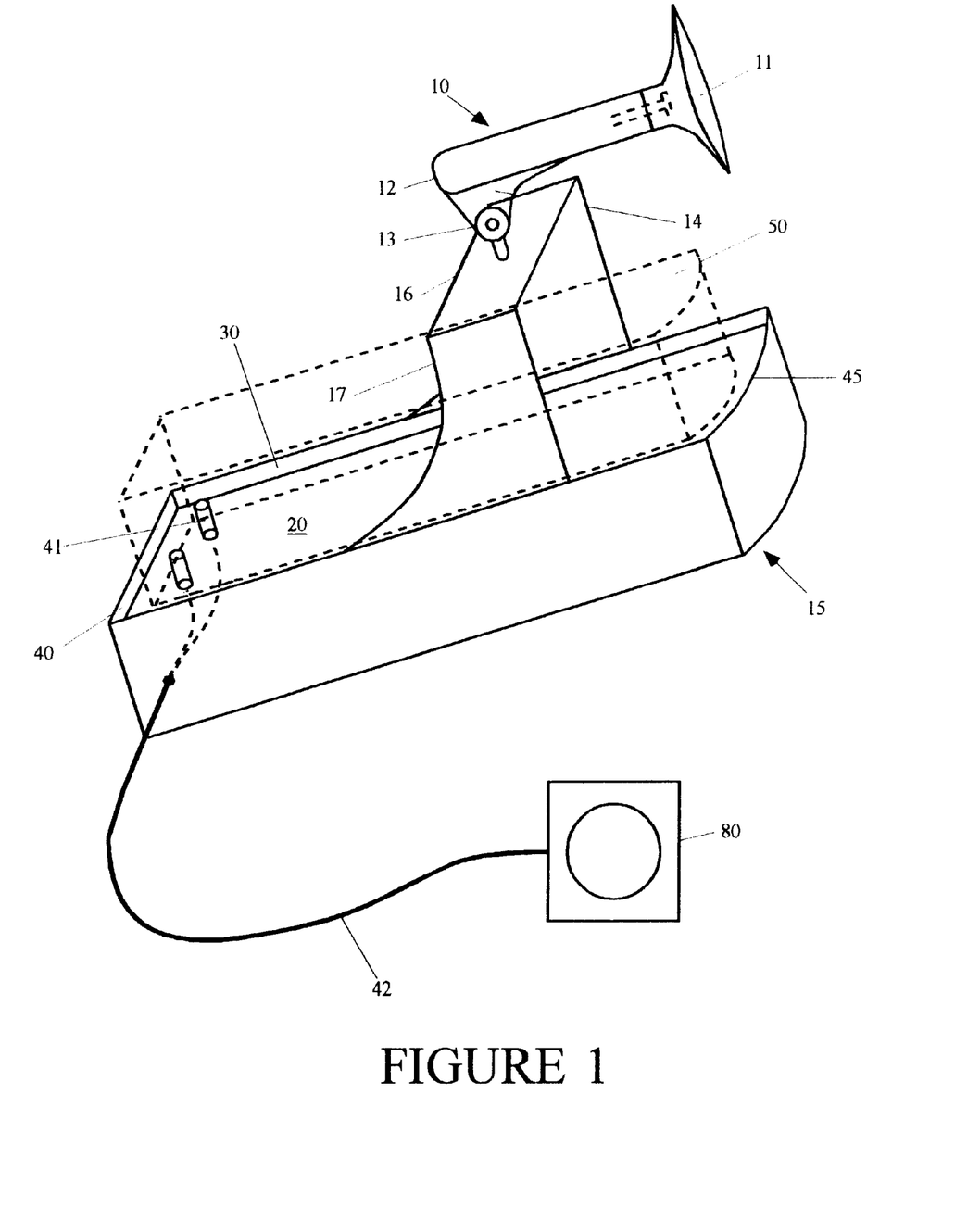
FIG. 1 is a perspective view of a support bracket for a parking aid of the present invention.

FIG. 1 is a perspective view of a support bracket for a parking aid of the present invention. The support bracket comprises a front windshield attachment bracket 10 and a laser support cradle (shown generally at 15) pivotally attached to front bracket 10. Support cradle 15 comprises a bottom laser support panel 20 and a lip 25 extending upwardly from support panel 20 around its entire periphery, defining side support panels 30, rear support panel 40, and front support panel 45.

Bracket 10 is provided with an elongate support arm 12 and a downwardly extending flange 14. The frontmost end of support arm 12 is equipped with a frontally directed suction cup 11. Suction cup 11 enables front windshield attachment bracket 10 to be easily attached to or removed from the interior of a vehicle windshield. Downwardly extending flange 14 is provided a bore hole at is base for receiving a threaded pin 13. Pin 13 pivotally attaches bracket 10 to an upwardly directed connecting member 16 mounted on the top portion of bridge member 17, which in turn is mounted to cradle assembly 15 to overhang a laser 50 (shown in phantom in FIG. 1). Laser 50 preferably comprises a commercially available class IIIa laser pointer, fitted with the electrical switch components of the present invention (described below). A suitable laser is readily commercially available from Apollo Presentation Products as Laser Pointer Model MP-900, although any similarly arranged class IIIa laser device with the addition of the electrical switch components of the present invention (described below) would suffice.

Pin 13 is threaded, such that after pin 13 is placed through connecting panel 16 and flange 14 of bracket 10, an internally threaded nut may be applied to the free end of threaded pin 13 to lock the angular position of cradle 15 with respect to front windshield attachment bracket 10. Thus, during the initial calibration (described below) of the visual parking aid of the present invention, a vehicle operator may adjust the elevation of the laser to any convenient viewing position and lock the elevation of the laser, in turn allowing the user to exit the vehicle to place a sign or other indicator on the wall or other obstruction in front of the vehicle. By locking the angular position of the laser, the operator is assured that each time the projected image reaches the position of the sign or other indicator positioned on the wall in front of the vehicle, the proper parking location has been obtained. Also, because the projected image is always projected at the same angle with respect to the vehicle, the perspective or line of sight of the user becomes irrelevant in determining the distance between the vehicle and the obstruction. The operator need only have any view of the obstruction, the projected image, and the sign or other indicia on the obstruction marking the final intended position of the projected image, to properly navigate the vehicle into its intended optimal parking position.

Figure 2:
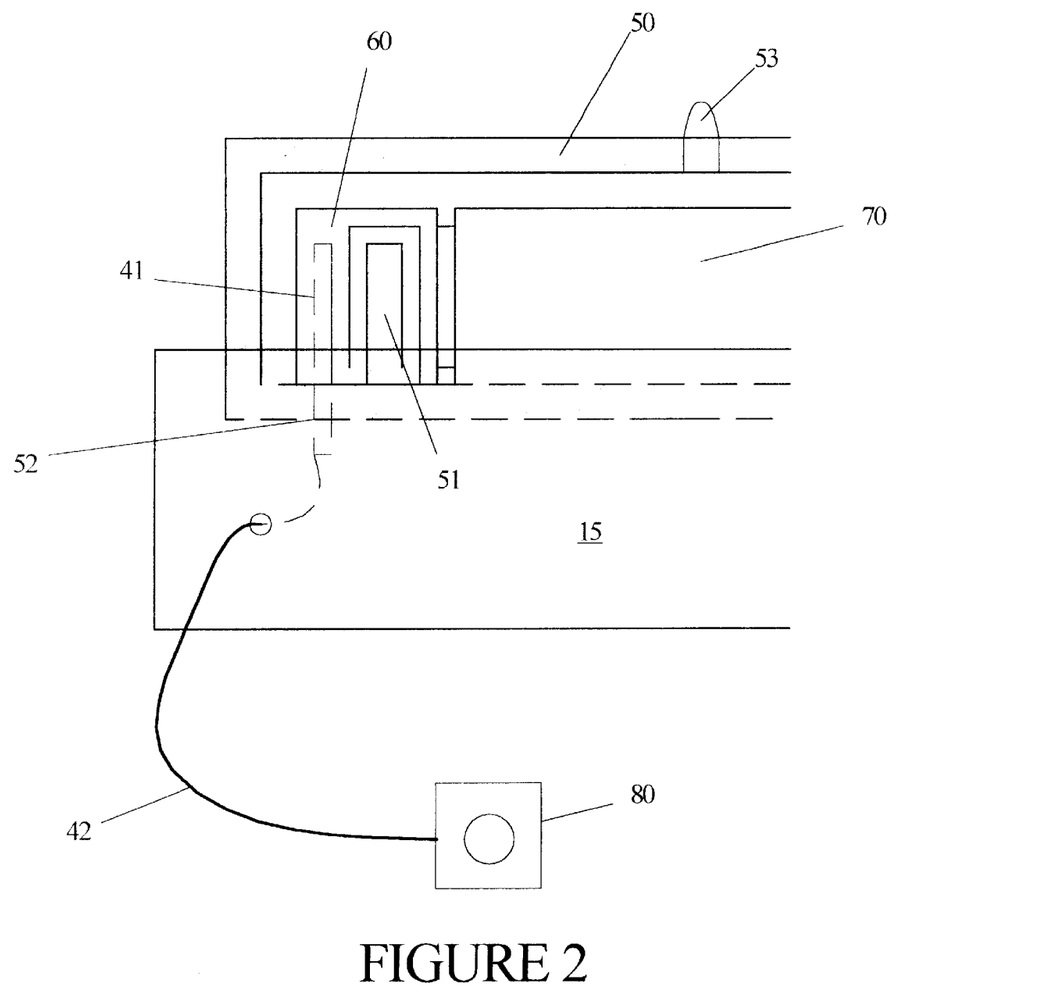
FIG. 2 is a detail side cross-sectional view of the support cradle and laser assembly.

Situated in the back portion of laser support panel 20 are male electrical connectors 41. Male electrical connectors 41 comprise elongate metal prongs extending upwardly through the back portion of laser support panel 20. As shown more particularly in the detail side cross-sectional view of FIG. 2, each electrical connector 41 is in electrical communication at their bottom ends with electrical lead wires 42 to a conventional timer switch 80, and at their top ends with a laser power supply 70 housed within laser 50. Lithium batteries serve as a preferred power source 70 for operating laser 50 in order to provide a compact, lightweight power source. However, any similarly arranged portable power source could likewise be utilized.

Figure 2A:
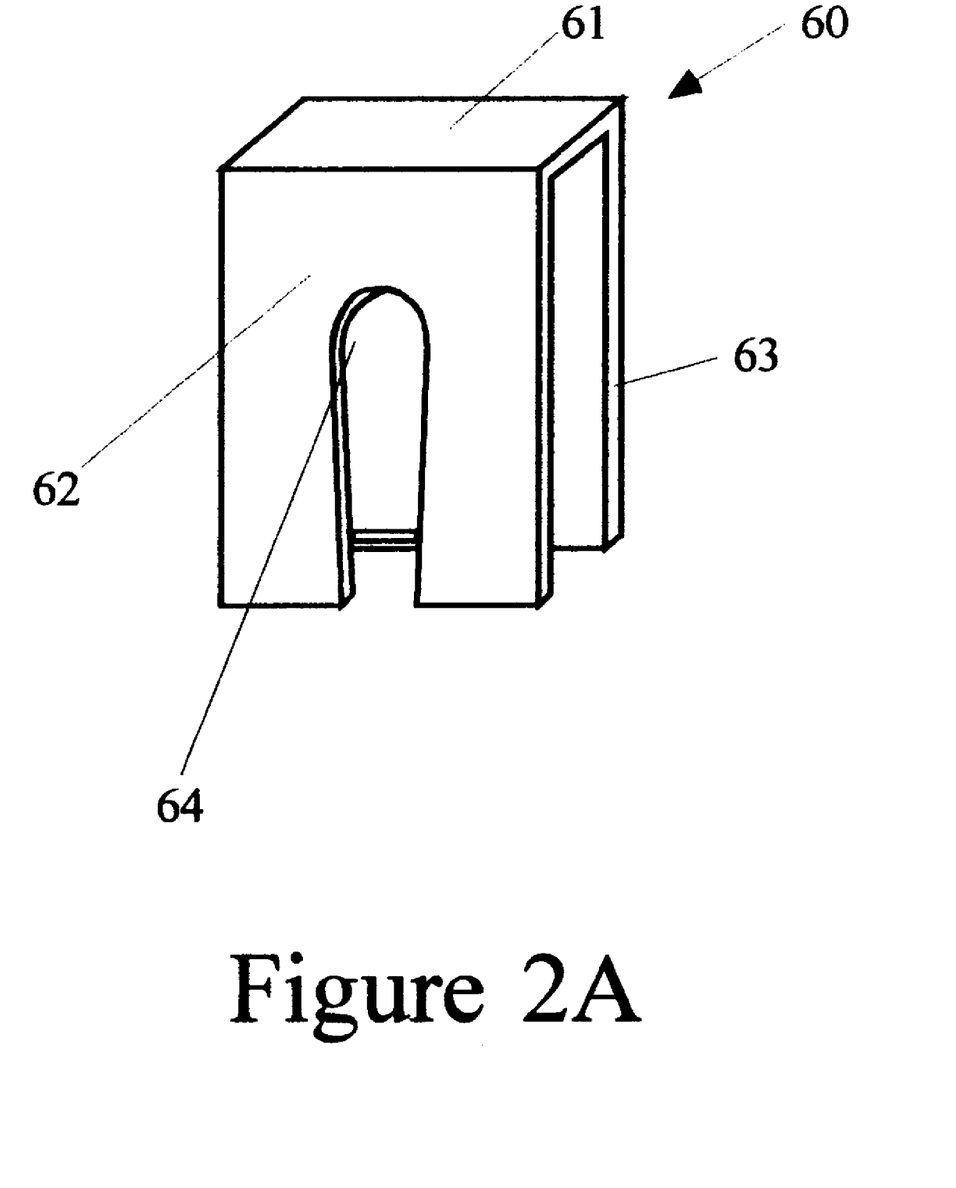
FIG. 2A is a perspective view of a metal clip 60.
Figure 3:
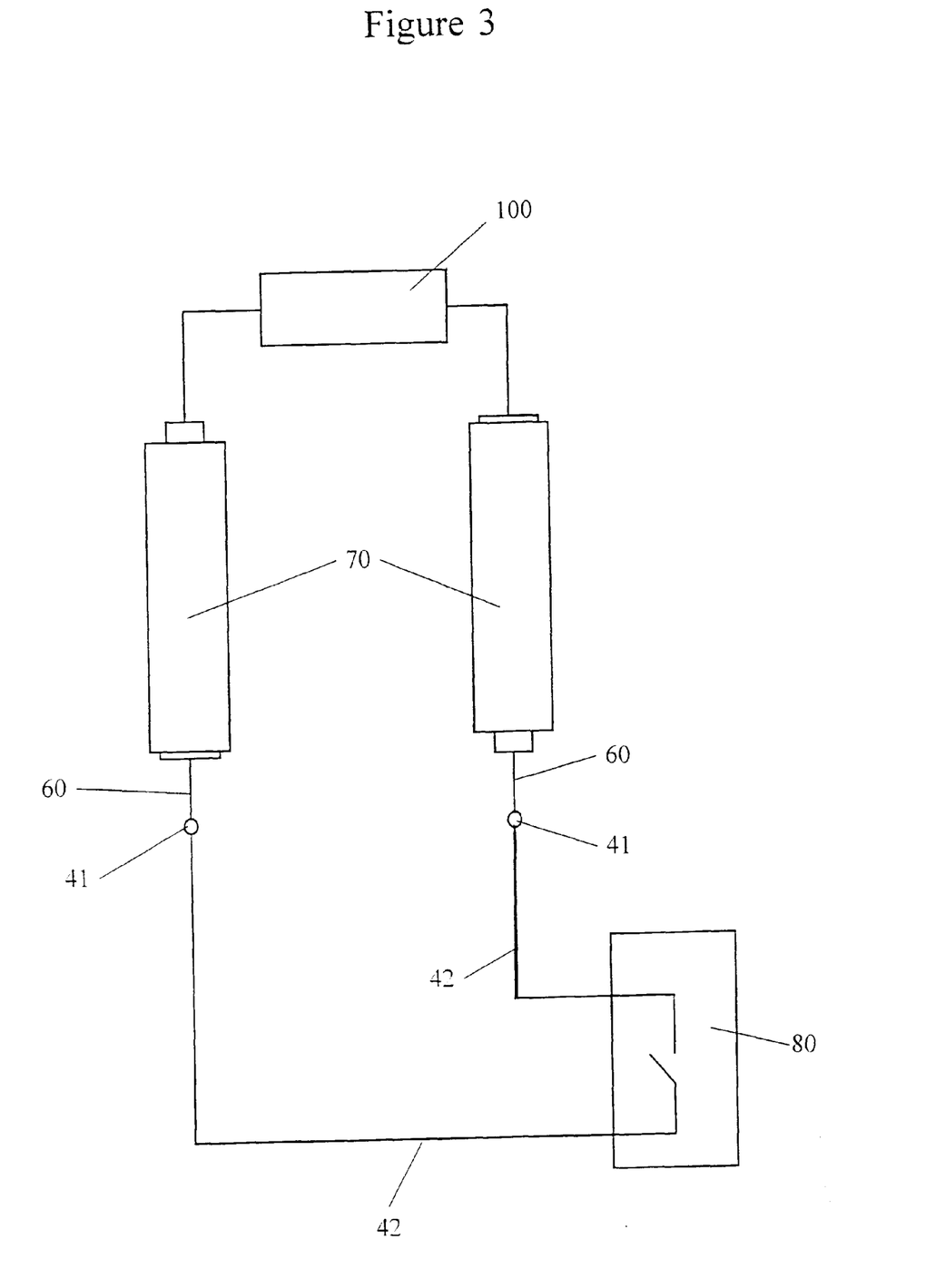
FIG. 3 is a schematic view of the electrical circuit of the present invention.

In order to accomplish the electrical connection between male electrical connectors 41 and power source 70, and in turn to complete the electrical circuit running between timer switch 80 and the laser emitter 100 (FIG. 3), a metal clip 60 is provided within the plastic housing of laser 50. Holes 52 are provided in the base of laser housing 50 for allowing electrical connectors 41 to extend into the laser body when the laser is placed on support panel 20. A plastic vertical wall 51 is positioned near the back of laser housing 50, just behind laser power source 70. Metal clip 60 is positioned to lie overtop of vertical wall 51. As shown in the detail perspective view of clip 60 of FIG. 2A, metal clip 60 has a top face 61, front face 63, and rear face 62. When placed within laser 50, top face 61 of clip 60 lies immediately overtop of vertical wall 51, while front face 63 is placed in electrical contact with power source 70. Rear face 62 in turn lies against the back side of vertical wall 51, and is provided with a female clamp opening 64 for receiving electrical connectors 41. Opening 64 is provided with a slightly narrowed mouth which is of sufficient width to allow electrical connector 41 to pass, but which firmly grips electrical connector 41 after it is inserted. Thus, when laser 50 is positioned on laser support panel 20, each electrical connector 41 extends into the laser housing through a hole 52 in the laser housing, and engage a clamp opening 64 on one of metal clips 60. The clamping force of opening 64 on electrical connector 41 is sufficient to hold laser housing 50 in position with respect to laser support panel 20.

As mentioned above, electrical connectors 41 are in electrical communication with both laser power source 70 and a timer switch 80 of conventional construction. As shown more particularly in FIG. 3, timer switch 80 completes an electrical circuit to provide power to laser emitter 100. Timer switch 80 allows a user to trigger operation of the laser when needed for a parking situation, but assures the user that the laser is not inadvertently left operational or caused to be directed out of the vehicle when unintended, in turn eliminating the risk of injuring an onlooker from inadvertent exposure to the laser. Likewise, because electrical connectors 41 and switch 80 are configured separate from the housing of laser 50, laser 50 is made inoperable unless it is properly positioned in support panel 20 such that electrical connectors 41 engage metal clips 60 to complete the electrical circuit. Thus, the user is also assured that the laser may not be used for other than its intended purpose, as placement within its support panel 20 which in turn is maintained within the vehicle is required to operate laser 50. Further, in order to assure the user that the laser is not inadvertently triggered, a light emitting diode (LED) 53 may also be provided extended outward from the top of the housing of laser 50 and placed in electrical communication with power source 70, such than when the power circuit is closed and laser 50 is made operational, LED) 53 immediately informs the user of the laser's operation.

In an alternate embodiment, switch 80 may be replaced by a remote actuator and timer circuit housed directly within laser support panel 20 and in electrical communication with electrical connectors 41. A remote actuator may be clipped or otherwise temporarily attached to the vehicle operator's visor, or stored in a compartment within the vehicle interior. When the operator pulls the vehicle into a parking space, the operator may trigger the remote actuator to is close the electrical circuit and power laser 50. Once again, the switch is provided with a timing mechanism to ensure that the laser is disabled following a predetermined period.

When front windshield connection plate 10 is applied to the interior of a vehicle's windshield, the angle of laser support bracket 20 may be adjusted by rotating the support bracket 20 about hinge pin 13, and locking support bracket 20 in position by tightening a bolt to the end of threaded pin 13. Laser housing 50 is guided into a properly seated position atop support panel 20 by rear support panel 40 side support panels 30, and front support panel 45. When so positioned, male electrical connectors align with and extend through holes 52 in the bottom of the housing of laser 50, in turn firmly holding laser 50 in place with respect to support panel 20 via the clamping force exerted by metal clips 60. This arrangement ensures that laser housing 50 always maintains a fixed orientation with respect to the vehicle in which it is mounted.

In use, a vehicle operator will first calibrate the image projected by laser 50 with respect to a fixed target. The vehicle operator first places laser housing 50 onto support cradle 15, such that clips 60 operatively engage male connectors 41 extending outward from rear support panel 40. The operator then enables laser 50 by triggering switch 80 (either through manual or remote actuation), which will in turn allow laser 50 to project its image through the windshield of the vehicle continuously for a duration of 20 seconds (or such other length of time as the operator may select through conventional timer switch 80). The operator then carefully moves the vehicle forward, occasionally checking the distance between the front of the vehicle and the obstruction in front of the vehicle, until an optimum position is achieved which leaves a safe distance between the front of the vehicle and the obstruction. The vehicle operator then exits the vehicle and marks the point on the obstruction at which the symbol from laser 50 has been directed. In a preferred embodiment of the present invention, an octagonal sign reading the message "STOP" may be used to mark the position at which the symbol from the laser 50 is finally directed thus directing the vehicle operator to stop forward motion when the optimal parking position has been achieved. However, any other suitable indicator, including even a simple horizontal line or any other indicia could be used to mark the final intended position of the symbol emitted from laser 50.

Further, while the image projected from laser 15 may take any form, such as a single point or a horizontal line, in a preferred embodiment laser 50 projects an image of a downwardly directed arrow such that the arrow points toward the final intended position as marked on the wall or obstruction.

Regardless of the precise image projected by laser 50, the image projected, when compared to the indicator marking the final intended position on the obstruction, immediately informs the vehicle operator not only of whether the vehicle must travel further forward, but also whether the vehicle is properly positioned laterally in the parking area. For example, if the projected image is located to the right of the final position indicator on the obstruction, the vehicle operator knows to direct the vehicle further to the left to ensure that the proper parking position is ultimately achieved.

Figure 4:
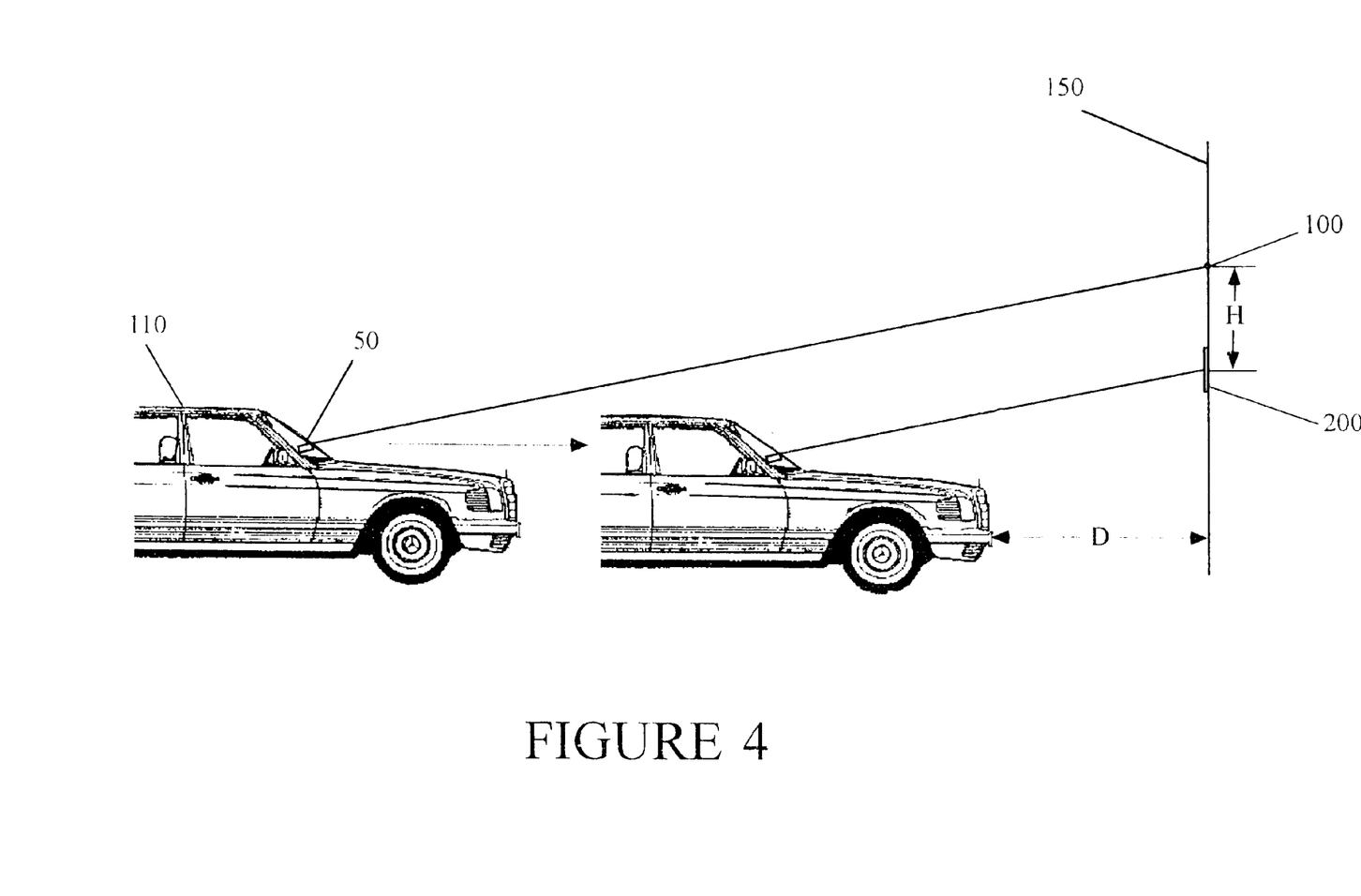
FIG. 4 is a side view of a vehicle using the visual parking aid of the present invention to achieve an optimum final parking position.

As shown particularly in FIG. 4, following initial calibration of the device, any time that the vehicle operator pulls their vehicle 110 into the parking space and is required to approach the obstruction 150, the operator simply engages switch 60 to power laser 50 and project the image towards obstruction 150 in front of the vehicle. At this point, the symbol emitted from laser 50 is projected onto a first point 100 on obstruction 150, point 100 lying a height H above the optimal position indicator 200. As the vehicle operator moves the vehicle forward, the point at which the symbol emitted from laser 50 impacts obstruction 150 descends, reducing height H as the symbol approaches optimal position indicator 200. When the symbol ultimately reaches position indicator 200, the vehicle is positioned at the predetermined, optimal distance D from obstruction 150.

It should also be noted that in the event that a vehicle operator wishes to back their vehicle into a parking spot having an obstruction at one end, the visual parking device of the present invention may be easily adapted to achieve this goal. To do so, front bracket 10 is attached to the rear window of the vehicle with the projected image being directed outward from the window towards the rear of the vehicle. The calibration of the device is achieved in the identical fashion to the forward moving vehicle, the operator marking the final position of the projected image to indicate an optimal distance between the rear of the vehicle and the obstruction. In use, the user may then simply look in their rear or side view mirrors to direct the projected image to the intended final position as the vehicle is reversed.

It may therefore be seen that the improved visual automobile parking device of the present invention enables a vehicle operator to navigate their vehicle up to an optimal distance from an obstruction located at one end of a parking space without requiring the vehicle operator to subjectively judge the distance between the front of the vehicle and the obstruction, and in turn risking an inadvertent impact between the vehicle and the obstruction. While the above specification describes a particularly preferred embodiment, various changes in the details, steps and materials that have been described may be made by those skilled in the art within the principles and scope of the invention herein illustrated and defined in the appended claims. Therefore, having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein, and that the scope of the invention is not to be limited to the details disclosed herein but is to be accorded the full scope of the claims so as to embrace any and all equivalent apparatus and methods.

I claim:

1. A visual automobile parking device comprising:
   a light emitting source, said light emitting source further comprising a power source for powering said light emitting source and a plurality of first electrical connectors in open electrical communication with said power source;
   a cradle support, said cradle support further comprising a plurality of second electrical connectors in open electrical communication with an electrical switch; and
   means for connecting each of said first electrical connectors to one of said second electrical connectors to form a closed circuit between said power source and said electrical switch.

2. The visual automobile parking device of claim 1, said cradle support further comprising:
   an upper elongate support panel configured to receive said light emitting source;
   a bridge member extending upward from and overlapping said support panel; and
   a support bracket pivotally attached to said bridge member.

3. The visual automobile parking device of claim 2, said support bracket further comprising:
   an elongate shaft having a front end and a downwardly extending flange, said downwardly extending flange being pivotally attached to said bridge member;
   means for locking the angular position of said support cradle with respect to said support bracket; and
   attachment means fixedly attached to said front end of said elongate shaft for removably attaching said support bracket to a vehicle window.

4. The visual automobile parking device of claim 3, said means for locking the angular position of said support cradle with respect to said support bracket further comprising a threaded pin extending through said downwardly extending flange and an upwardly extended projection on said bridge member, said threaded pin pivotally attaching said flange to said projection, and a threaded nut applied to an end of said threaded pin to clamp said flange against said projection.

5. The visual automobile parking device of claim 3, wherein said attachment means comprises a suction cup.

6. The visual automobile parking device of claim 1, said cradle support further comprising an upper elongate support panel configured to receive said light emitting source, and said plurality of second electrical connectors comprising elongate metal pins extending through said upper elongate support panel.

7. The visual automobile parking device of claim 6, said first electrical connectors comprising a metal clip positioned within said light emitting source.

8. The visual automobile parking device of claim 7, said means for connecting each of said first and second electrical connectors comprising an aperture in said metal clip, said aperture being configured to receive therein one of said elongate metal pins to place said first electrical connectors in electrical communication with said second electrical connectors to form a closed circuit.

9. The visual automobile parking device of claim 1 wherein said electrical switch comprises a timer switch.

10. A visual automobile parking device comprising:
    a light emitting source, said light emitting source further comprising a first plurality of electrical connectors in electrical communication with a power source for powering said light emitting source and defining a first open electrical circuit;
    a cradle support, said cradle support further comprising a support panel configured to receive said light emitting source, said support panel further comprising a second plurality of electrical connectors in electrical communication with an electrical switch defining a second open electrical circuit; and
    means for connecting said first open electrical circuit to said second open electrical circuit to form a closed circuit between said power source and said electrical switch.

11. The visual automobile parking device of claim 10, said cradle support further comprising:
    a bridge member extending upward from and overlapping said support panel; and
    a support bracket pivotally attached to said bridge member.

12. The visual automobile parking device of claim 11, said support bracket further comprising:
    an elongate shaft having a front end and a downwardly extending flange, said downwardly extending flange being pivotally attached to said bridge member;
    means for locking the angular position of said support cradle with respect to said support bracket; and
    attachment means fixedly attached to said front end of said elongate shaft for removably attaching said support bracket to a vehicle window.

13. The visual automobile parking device of claim 10, said second electrical connectors comprising elongate metal pins extending through said support panel.

14. The visual automobile parking device of claim 13, said first electrical connectors comprising a metal clip positioned within said light emitting source.

15. The visual automobile parking device of claim 14, said means for connecting said first open electrical circuit to said second open electrical circuit comprising an aperture in said metal clip, said aperture being configured to receive therein one of said elongate metal pins to place said first electrical connectors in electrical communication with said second electrical connectors to form a closed circuit.

16. The visual automobile parking device of claim 10 wherein said electrical switch comprises a timer switch.

17. A visual automobile parking device comprising:

a light emitting source, said light emitting source further comprising a power source for powering said light emitting source and a first plurality of electrical connectors fixedly attached to said light emitting source and in electrical communication with said power source, said power source and said first plurality of electrical connectors defining a first open circuit;

a cradle support, said cradle support further comprising an upper support panel and a second plurality of electrical connectors fixedly attached to said upper support panel, said second plurality of electrical connectors being in electrical communication with an electrical switch, and said second plurality of electrical connectors defining a second open circuit;

said light emitting source being positioned on said upper support panel, and said first plurality of electrical connectors being in electrical communication with said second plurality of electrical connectors to define a closed circuit between said electrical switch and said power source.

18. The visual automobile parking device of claim 17, said cradle support further comprising:

a bridge member extending upward from and overlapping said support panel; and a support bracket pivotally attached to said bridge member.

19. The visual automobile parking device of claim 18, said support bracket further comprising:

an elongate shaft having a front end and a downwardly extending flange, said downwardly extending flange being pivotally attached to said bridge member;

means for locking the angular position of said support cradle with respect to said support bracket; and attachment means fixedly attached to said front end of said elongate shaft for removably attaching said support bracket to a vehicle window.

20. The visual automobile parking device of claim 17, said second electrical connectors comprising elongate metal pins extending through said upper support panel, and said first electrical connectors comprising a metal clip positioned within said light emitting source.

* * * * *